US010527435B2

(12) United States Patent
Biswas et al.

(10) Patent No.: US 10,527,435 B2
(45) Date of Patent: Jan. 7, 2020

(54) APPARATUS AND ASSOCIATED METHODS FOR USE IN LIVE NAVIGATION

(71) Applicant: Nokia Technologies Oy, Espoo (FI)

(72) Inventors: Debmalya Biswas, Lausanne (CH); Julian Nolan, Pully (CH); Matthew John Lawrenson, Lausanne (CH)

(73) Assignee: Nokia Technologies Oy, Espoo (FI)

( * ) Notice: Subject to any disclaimer, the term of this patent is extended or adjusted under 35 U.S.C. 154(b) by 124 days.

(21) Appl. No.: 15/562,616

(22) PCT Filed: Apr. 2, 2015

(86) PCT No.: PCT/IB2015/000569
§ 371 (c)(1),
(2) Date: Sep. 28, 2017

(87) PCT Pub. No.: WO2016/156902
PCT Pub. Date: Oct. 6, 2016

(65) Prior Publication Data
US 2018/0106622 A1    Apr. 19, 2018

(51) Int. Cl.
*G01C 21/30* (2006.01)
*G01C 21/34* (2006.01)
*G01C 21/36* (2006.01)

(52) U.S. Cl.
CPC ......... *G01C 21/30* (2013.01); *G01C 21/3453* (2013.01); *G01C 21/3688* (2013.01); *G01C 21/3694* (2013.01); *G01C 21/3697* (2013.01)

(58) Field of Classification Search
CPC ................ G01C 21/30; G01C 21/3697; G01C 21/3694; G01C 21/3688; G01C 21/3453;
(Continued)

(56) References Cited

U.S. PATENT DOCUMENTS 7,613,563 B2 * 11/2009 Haegebarth .............. G08G 1/20
701/117
2009/0276154 A1 * 11/2009 Subramanian ......... G01C 21/20
701/469
(Continued)

FOREIGN PATENT DOCUMENTS

EP          1296305         3/2003
WO       2010092435         8/2010
WO    2013/186061 A1      12/2013

OTHER PUBLICATIONS

International Search Report and Written Opinion received for corresponding Patent Cooperation Treaty Application No. PCT/IB2015/000569, dated Nov. 30, 2015, 8 pages.
(Continued)

*Primary Examiner* — Anne M Antonucci
(74) *Attorney, Agent, or Firm* — Locke Lord LLP

(57) ABSTRACT

An apparatus comprising a processor and memory including computer program code, the memory and computer program code configured to, with the processor, enable the apparatus at least to: for a defined road journey through a road network from a start location to an end location, assign respective sub-portions of the defined road journey to each of a group of mobile devices associated with one or more travellers for the road journey according to at least one predefined assignment criterion, wherein each of the group of mobile devices is configured for provision of live mapping data for live navigation of the respective sub-portion of the road journey.

19 Claims, 6 Drawing Sheets

(58) Field of Classification Search
CPC .............. G01C 21/3438; G01C 21/343; G06Q 10/08355; G06Q 10/047; G06Q 50/30
See application file for complete search history.

(56) References Cited

U.S. PATENT DOCUMENTS

| | | |
|---|---|---|
| 2012/0282945 A1 | 11/2012 | Guha et al. |
| 2013/0268582 A1 | 10/2013 | Sitati et al. |
| 2014/0164322 A1 | 6/2014 | Beaurepaire et al. |
| 2014/0172798 A1 | 6/2014 | Falkenburg et al. |
| 2014/0181203 A1 | 6/2014 | Hegarty et al. |

OTHER PUBLICATIONS

Yang et al., "Location-Preserved Contention Based Routing in VANETs", Security and Communication Networks, 2010, pp. 1-13.

Myles et al., "Preserving Privacy in Environments with Location-Based Applications", IEEE Pervasive Computing, vol. 2, No. 1, 2003, pp. 56-64.

Bettini et al., "Protecting Privacy Against Location-Based Personal Identification", Secure Data Management, vol. 3674, 2005, 14 pages.

\* cited by examiner

Figure 5a

| Device | Sub-portion | | | |
|---|---|---|---|---|
| | A-1 | 1-2 | 2-3 | 3-B |
| 1 | ✓ | ✓ | ✗ | ✓ |
| 2 | ✓ | ✗ | ✓ | ✓ |
| 3 | ✗ | ✓ | ✓ | ✓ |
| 4 | ✗ | ✓ | ✓ | ✗ |

Figure 5b

| Device | Sub-portion | | | |
|---|---|---|---|---|
| | A-1 | 1-2 | 2-3 | 3-B |
| 1 | 3 | 0 | 2 | 1 |
| 2 | 1 | 1 | 3 | 0 |
| 3 | 0 | 2 | 0 | 3 |
| 4 | 3 | 3 | 3 | 2 |

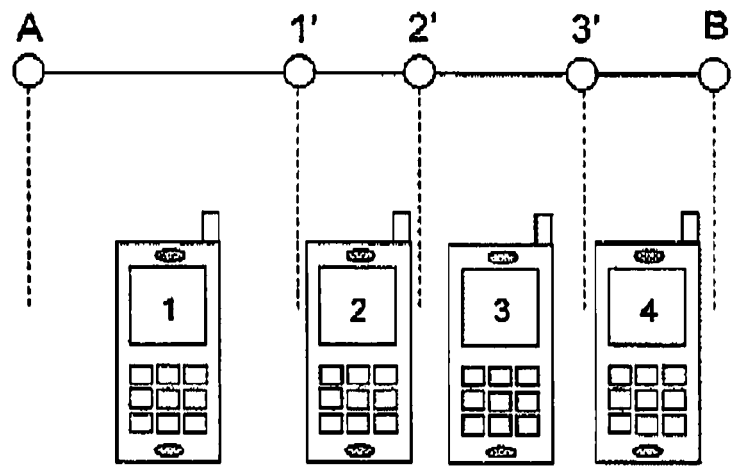
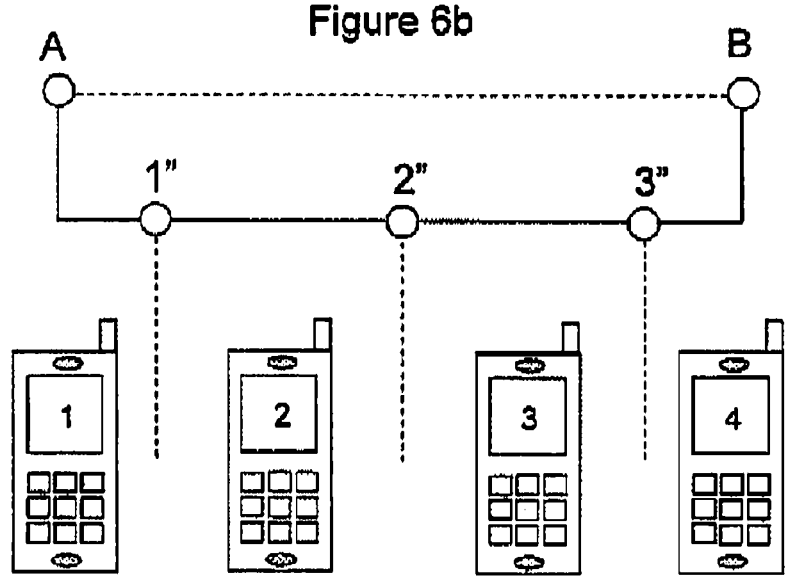

714 — Assign respective sub-portions of defined road journey to group of mobile devices according to at least one predefined assignment criterion 715 — Provide/end live mapping data for assigned sub-portion of defined road journey 716 — Use live mapping data received from respective mobile devices for live navigation of road journey

APPARATUS AND ASSOCIATED METHODS FOR USE IN LIVE NAVIGATION

RELATED APPLICATION

This application was originally filed as PCT Application No. PCT/IB2015/000569 filed Apr. 2, 2015.

TECHNICAL FIELD

The present disclosure relates to the field of live navigation, associated methods and apparatus, and in particular concerns an apparatus configured to assign sub-portions or a defined road journey to a group of mobile devices so that each device can provide live mapping data for live navigation of a respective sub-portion of the road journey. Certain disclosed example aspects/embodiments relate to portable electronic devices. In particular, so-called hand-portable electronic devices which may be hand-held in use (although they may be placed in a cradle in use). Such hand-portable electronic devices include so-called Personal Digital Assistants (PDAs), smartwatches, smart eyewear and tablet PCs. In some embodiments, the apparatus may be built-in to a vehicle, for example, as part of a satellite navigation system.

The portable electronic devices/apparatus according to one or more disclosed example aspects/embodiments may not be limited to just navigation/road mapping functionality but may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending or data functions, image capture function (e.g. using a (e.g. in-built) digital camera), and gaming functions.

BACKGROUND

Research is currently being done to develop improved navigation devices which can provide a user with live mapping data for a defined road journey to aid navigation of the road journey.

The listing or discussion of a prior-published document or any background in this specification should not necessarily be taken as an acknowledgement that the document or background is part of the state of the art or is common general knowledge.

SUMMARY

According to a first aspect, there is provided an apparatus comprising a processor and memory including computer program code, the memory and computer program code configured to, with the processor, enable the apparatus at least to:

for a defined road journey through a road network from a start location to an end location, assign respective sub-portions of the defined road journey to each of a group of mobile devices associated with one or more travellers for the road journey according to at least one predefined assignment criterion, wherein each of the group of mobile devices is configured for provision of live mapping data for live navigation of the respective sub-portion of the road journey.

The at least one predefined assignment criterion may comprise a device capability criterion related to the capability of each mobile device in providing live mapping data for a particular sub-portion of the road journey.

The device capability criterion may be based on one or more of the processing power, battery life and network coverage of the mobile device at the particular sub-portion of the road journey.

The at least one predefined assignment criterion may comprise a traveller sensitivity criterion related to the sensitivity of the traveller associated with each mobile device to a particular sub-portion of the road journey.

The traveller sensitivity criterion may be based on the sensitivity of the traveller to one or more of a location within the sub-portion, a time of travel within the sub-portion and a history of travel within the sub-portion.

The traveller sensitivity criterion for each traveller may be stored locally on the associated mobile device, and the apparatus may be configured to receive the traveller sensitivity criterion from the associated mobile device on request (e.g. request by the apparatus).

The group of mobile devices may be associated with a plurality of travellers using respective vehicles for the road journey (e.g. by flags associating each of the devices of the group to one another and/or the road journey), and the at least one predefined assignment criterion may comprise a suitability criterion related to the suitability at each traveller or vehicle in leading the plurality of travellers for the duration of a particular sub-portion of the road journey.

The apparatus may be configured to assign the respective sub-portions according to a binary system or scoring system based on the at least one predefined assignment criterion.

The apparatus may be configured to assign alternative sub-portions of the defined road journey to the respective mobile devices if the sub-portions cannot be suitably assigned according to the at least one predefined assignment criterion.

The apparatus may be configured to assign respective sub-portions of an alternative road journey through the road network from the start location to the end location if the sub-portions of the defined road journey cannot be suitably assigned according to the at least one predefined assignment criterion.

The apparatus may be configured to assign a plurality of equally sized sub-portions to the respective mobile devices corresponding to the number of mobile devices forming the group of mobile devices.

The group of mobile devices may be associated with a plurality of travellers using respective vehicles far the road journey, and the apparatus may be configured to assign a plurality of sub-portions to the respective mobile devices having end points at locations where it is safe and/or convenient for the vehicles to overtake one another on the road network.

The group of mobile devices may be associated with a plurality of travellers using respective vehicles for the road journey, and the apparatus may be configured to transmit an instruction to one of the mobile devices when the current location of the group of mobile devices corresponds to the start (e.g. within a predefined tolerance/distance/time of the start) of the respective sub-portion assigned to that particular mobile device, the instruction configured to prompt the traveller associated with the mobile device to lead the plurality of travelers for the duration of the respective sub-portion. The instruction may be visual and/or audible, and may be configured to prompt the mobile device to turn on or start providing live mapping data for the respective sub-portion (and possibly for a portion of the journey immediately before the respective sub-portion).

The apparatus may be configured to receive the live mapping data for each sub-portion of the defined road journey from the respective mobile devices.

The live mapping data may comprise one or more of navigation data, travel updates, weather updates, local news and advertising data for the respective sub-portions of the road journey.

The apparatus may be or form part of one of the group of mobile devices, or may be or form part of a device separate to the group of mobile devices.

The apparatus may be one or more of an electronic device, one of the group of mobile devices, a portable electronic device, a portable telecommunications device, a mobile phone, a personal digital assistant, a tablet, a phablet, a desktop computer, a laptop computer, a server, a smartphone, a smartwatch, smart eyewear, a portable satellite navigation device, an in-built vehicle satellite navigation device, and a module for one or more of the same.

According to a further aspect, there is provided an apparatus comprising a processor and memory including computer program code, the memory and computer program code configured to, with the processor, enable the apparatus at least to:
  during travel on a defined road journey through a road network from a start location to an end location, use received live mapping data for live navigation for the journey, the live mapping data received from each of a group of mobile devices associated with one or more travellers for the road journey, each of the group of mobile devices configured for provision of live mapping date for a respective sub-portion of the road journey.

The apparatus may be one or more of the apparatus according to the first aspect, an electronic device, one of the group of mobile devices, a portable electronic device, a portable telecommunications device, a mobile phone, a personal digital assistant, a tablet, a phablet, a desktop computer, a laptop computer, a server, a smartphone, a smartwatch, smart eyewear, a portable satellite navigation device, an in-built vehicle satellite navigation device, and a module for one or more of the same.

According to a further aspect, there is provided a system comprising the apparatus and group of mobile devices.

Some or all of the mobile devices forming the group of mobile devices (of any of the aforementioned or subsequently mentioned aspects) may be associated with the same traveller or different travellers.

According to a further aspect, there is provided an apparatus comprising a processor and memory including computer program code, the memory and computer program code configured to, with the processor, enable the apparatus at least to:
  during travel on a defined road journey through a road network from a start location to an end location, provide live mapping data for live navigation for the journey, the live mapping data provided from one of a group of mobile devices associated with one or more travellers for the road journey, each of the group of mobile devices configured for provision of live mapping data for a respective sub-portion of the road journey.

The apparatus may be configured to initiate the provision of five mapping data for the respective sub-portion when the current location of the group of mobile devices corresponds to the start (e.g. within a predefined tolerance/distance/time of the start) of the respective sub-portion, and may be configured to end the provision of live mapping data for the respective sub-portion when the current location of the group of mobile devices corresponds to the end (e.g. within a predefined tolerance/distance/time of the end) of the respective sub-portion.

The apparatus may be configured to provide the live mapping data for the respective sub-portion by presenting (e.g. visually and/or audibly) the live mapping data to the one or more travellers for live navigation of the road journey.

The apparatus may be configured to provide the live mapping data for the respective sub-portion by transmitting the live mapping data to a central device for live navigation of the road journey.

The central device may be one of the group of mobile devices, a device separate to the group of mobile devices, or an apparatus configured to assign respective sub-portions according to the first aspect.

The central device may be the mobile device having one or more of the greatest processing power, battery life and data security of the group of mobile devices.

The apparatus may be or form part of one of the group of mobile devices, the group of mobile devices may be associated with a plurality of travellers using respective vehicles for the road journey, and the apparatus may be configured to provide the love mapping data for the respective sub-portion by transmitting the live mapping data to at least one of the other mobile devices of the group.

The apparatus may be configured to transmit the live mapping data when the traveller associated with the mobile device is out of visibility of the travellers associated with the at least one other mobile device.

Each of the group of mobile devices may be configured to obtain the live mapping data for the respective sub-portion via a mapping application and mapping data provider associated with the mobile device, and one or both of the mapping application and mapping data provider associated with each mobile device may be different.

The apparatus may be or form part of one of the group of mobile devices.

According to a further aspect, there is provided an apparatus comprising a processor and memory including computer program code, the memory and computer program code configured to, with the processor, enable the apparatus at least to:
  during travel on a defined road journey through a road network from a start location to an end location, are or more of provide and end live mapping data for live navigation for the journey from one of a group of mobile devices associated with respective one or more travellers for the road journey, each of the group of mobile devices configured for provision of live mapping data fora respective sub-portion of the road journey, wherein the live mapping data is one or more of provided and ended from a respective mobile device based on a provision criterion, the provision criterion determined using the current location on the journey of the mobile device with respect to the particular sub-portion of the respective mobile device to allow each respective mobile device to take on and end, in sequence order, provision of live mapping data for the respective sub-portion.

The apparatus may be one or more of an apparatus according to any aforementioned or subsequently mentioned aspects, an electronic device, one of the group of mobile devices, a portable electronic device, a portable telecommunications device, a mobile phone, a personal digital assistant, a tablet, a phablet, a laptop computer, a smartphone, a smartwatch, smart eyewear, a portable satellite navigation device, an in-built vehicle satellite navigation device, and a module for one or more of the same.

According to a further aspect, there is provided a method comprising:

for a defined road journey through a road network from a start location to an end location, assigning respective sub-portions of the defined road journey to each of a group of mobile devices associated with one or more travellers for the road journey according to at least one predefined assignment criterion, wherein each of the group of mobile devices is configured for provision of live mapping data for live navigation of the respective sub-portion of the road journey.

According to a further aspect, there is provided a method comprising:

during travel on a defined road journey through a road network from a start location to an end location, using received live mapping data for live navigation for the journey, the live mapping data received from each of a group of mobile devices associated with one or more travellers for the road journey, each of the group of mobile devices configured for provision of live mapping data for a respective sub-portion of the road journey.

According to a further aspect, there is provided a method comprising:

during travel on a defined road journey through a road network from a start location to an end location, providing live mapping data for live navigation for the journey, the live mapping data provided from one of a group of mobile devices associated with one or more travellers for the road journey, each of the group of mobile devices configured for provision of live mapping data for a respective sub-portion of the road journey.

According to a further aspect, there is provided a method comprising:

during travel on a defined road journey through a road outwork from a start location to an end location, one or more of providing and ending live mapping data for live navigation for the journey from one of a group of mobile devices associated with respective one or more travellers for the road journey, each of the group of mobile devices configured for provision of live mapping data for a respective sub-portion of the road journey, wherein the live mapping data is one or more of provided and ended from a respective mobile device based on a provision criterion, the provision criterion determined using the current location on the journey of the mobile device with respect to the particular sub-portion of the respective mobile device to allow each respective mobile device to take on and end, in sequence order, provision of live mapping data for the respective sub-portion.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means or functional units for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:

FIG. 5a illustrates schematically a binary system for assigning the respective sub-portions to the group of mobile devices;

FIG. 5b illustrates schematically a scoring system for assigning the respective sub-portions to the group of mobile devices;

FIG. 6a illustrates schematically the assignment of alternative sub-portions of the defined road journey to the group of mobile devices;

FIG. 6b illustrates schematically the assignment of respective sub-portions of an alternative road journey to the group of mobile devices;

DESCRIPTION OF SPECIFIC ASPECTS/EMBODIMENTS

Figure 1:
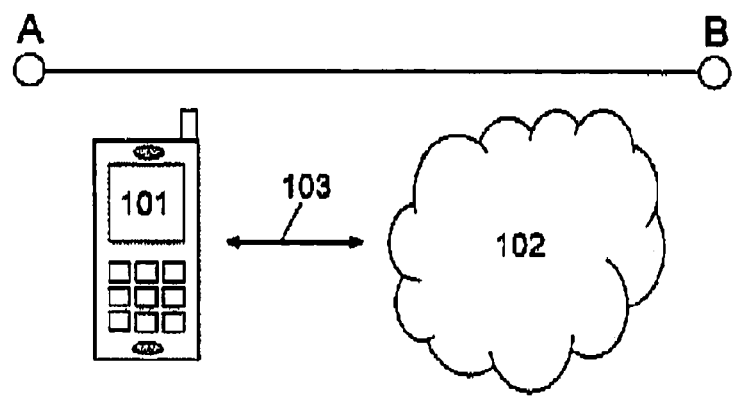
FIG. 1 illustrates schematically a mobile device configured to obtain live mapping data for a defined road journey from a mapping data provider.

FIG. 1 shows a scenario in which a traveller requires live mapping data for use in navigating a road journey A-B through a road network from a start location A to an end location B. In this scenario, the traveller would typically provide the start A and end B locations of the journey (although the traveller's current location may be used as the start location A) to a mapping application on his/her mobile device 101, and the mapping application would then receive live mapping data for the journey from a mapping data provider 102 and provide said data to the traveller. The live mapping data may comprise one or more of navigation data, travel updates, weather updates, local news and advertising data for the road journey A-B, and may be obtained via any wired or wireless connection 103 (e.g. at least one of a data cable, a telecommunications network, radio, satellite, WiMAX™, WiFi™ and Bluetooth™). The mapping data provider 102 is shown in FIG. 1 as a cloud to illustrate the fact that it may comprise any remote device(s) or service(s) to which the travellers mobile device 101 can be connected.

By monitoring the traveller's location, the mapping application is able to provide the traveller with real-time navigation instructions which take account of any current issues that might affect the journey A-B. This can be used, for example, to determine the fastest route through the road network from the start location A to the end location B at a particular time, which might not necessarily be the shortest route through the road network.

In some cases, the mapping application may be configured to store/log one or both of the proposed route and the traveller's location throughout the road journey A-B (either locally or on a remote server) to enable customisation of its services for future journeys. The mapping application may even provide this location data to the mapping data provider 102 to enable customisation of future live mapping data. For example, if the location data comprises details of any shops or restaurants that the traveller visited on the road journey A-B, the mapping data provider 102 could use this information to provide the traveller with associated advertising data on a subsequent journey.

Whilst the ability to obtain live mapping data for a journey A-B provides navigational advantages, a disadvantage of the above-mentioned scenario is that the mapping application and mapping data provider 102 are able to acquire information on the traveller's whereabouts, which may be considered by some travellers to be a breach of privacy. As mentioned above, this information includes one or more of the start A and end B locations, the proposed route, and the traveller's tracked location throughout the journey A-B.

One way of concealing the start A and end B locations (and therefore the route) may involve the traveller and/or mapping application requesting live mapping data for a region encompassing the journey A-B (e.g. a neighbourhood, town, city, county, or country) rather than requesting live mapping data for the journey A-B per so. However, this increase in abstraction level requires a greater amount of live mapping data and therefore has bandwidth and storage repercussions.

One way of concealing the traveller's current location throughout the journey A-B may involve the traveller turning off the location sharing function on his/her mobile device 101, or using a location anonymization technique. However, these approaches inhibit the mapping application from providing the traveller with live mapping data specific to the traveller's current location, and are therefore unsuitable in this scenario.

There will now be described an apparatus and associated methods that may provide a possible solution to the above-mentioned privacy issues.

Figure 2:
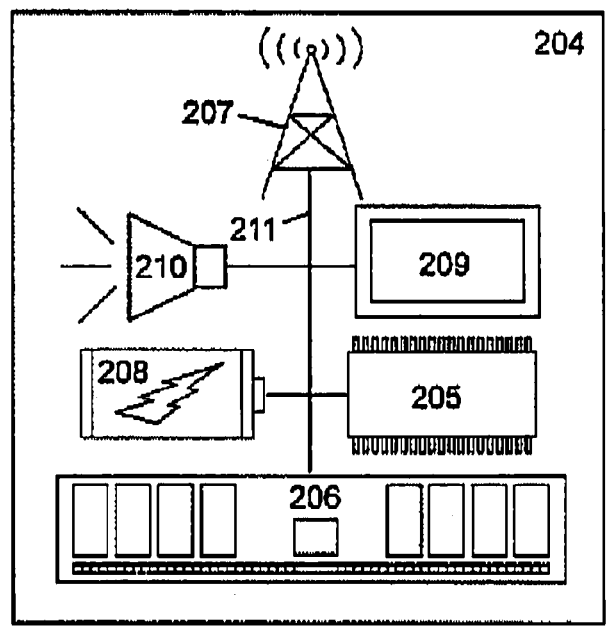
FIG. 2 illustrates schematically one example of an apparatus described herein.

FIG. 2 shows an apparatus 204 configured to perform one or more methods described herein. The apparatus 204 may be at least one of an electronic device, a portable electronic device, a portable telecommunications device, a standalone or vehicle in-built navigation device, a satellite navigation device, a mobile phone, a personal digital assistant, a smartphone, a smartwatch, smart eyewear, a phablet, a tablet, a laptop computer, a desktop computer, a server, and a module for one or more of the same.

In this example, the apparatus 204 comprises a processor 205, a memory 206, a transceiver 207, a power supply 208, an electronic display 209 and a loudspeaker 210, which are electrically connected to one another by a data bus 211. The processor 205 is configured for general operation of the apparatus 204 by providing signalling to, and receiving signalling from the other components to manage their operation. The memory 206 is configured to store computer program code configured to perform, control or enable operation of the apparatus 204. The memory 206 may also be configured to store settings for the other components. The processor 205 may access the memory 206 to retrieve the component settings in order to manage the operation of the other components. The processor 205 may be a microprocessor, including an Application Specific Integrated Circuit (ASIC). The memory 208 may be a temporary storage medium such as a volatile random access memory. On the other hand, the memory 206 may be a permanent storage medium such as a hard disk drive, a flash memory, or a non-volatile random access memory.

The transceiver 207 is configured to transmit data (e.g. live mapping data or data associated with performing one or more of the aforementioned or subsequently mentioned aspects) to, and/or receive data from, other apparatus/devices, and may comprise a separate transmitter and receiver. The power supply 208 is configured to provide the other components with electrical power to enable their functionality, and may comprise one or more of a mains adapter, a battery, a capacitor, a supercapacitor, and a battery-capacitor hybrid. The electronic display 209 may be an LED, LCD or plasma display, and is configured to display visual content which is stored on (e.g. on the storage medium) or received by (e.g. via the transceiver) the apparatus 204. Similarly, the loudspeaker 210 is configured to output audio content which is stored on or received by the apparatus 204. The visual and audio content may comprise related components of a combined audio-visual content. In some examples, the audio and/or visual content may comprise live mapping data (such as one or more of navigation data, travel updates, weather updates, local news and advertising data).

Figure 3:
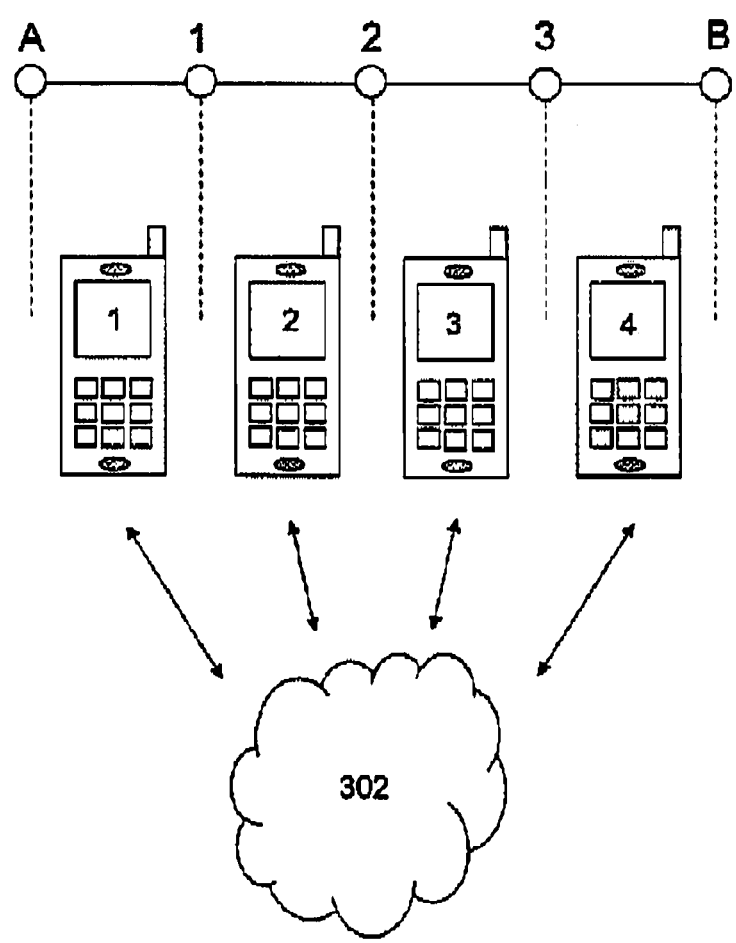
FIG. 3 illustrates schematically the assignment of respective sub-portions of a defined road journey to each of a group of mobile devices.

FIG. 3 shows one method of obtaining live mapping data for a road journey A-B which may help to reduce the amount of traveller location information obtained from a mapping application and/or data provider 302. This method involves the use of a group of mobile devices 1-4 associated with one or more travellers that are intending to travel together on a defined road journey A-B. Some or all of these mobile devices 1-4 may be associated with the same traveller, or they may be associated with different travellers. Furthermore, the mobile devices 1-4 which are available to participate in the method may be configured to make their availability known to one another or to a central device. This could be achieved in practice by transmitting an identification signal which can be detected by any device within a predefined radius of the mobile device 1-4. In this way, the available mobile devices 1-4 can be determined by scanning the vicinity for any identification signals. The devices 1-4 may be associated together in a particular traveller group by use of a predefined flag to indicate the grouping.

Rather than a single mobile device requesting live mapping data from the mapping application/data provider 302, each mobile device 1-4 in the group is assigned by the apparatus 204 a respective sub-portion of the defined road journey A-B according to at least one predefined assignment criterion. The assignment step may take place before the travellers embark on the journey A-B or during the journey A-B. In this illustrated example, mobile device 1 has been assigned sub-portion A-1, mobile device 2 has been assigned sub-portion 1-2, mobile device 3 has been assigned sub-portion 2-3, and mobile device 4 has been assigned sub-portion 3-B. Each mobile device 1-4 is configured to request live mapping data for live navigation of its respective sub-portion of the road journey A-B from a mapping data provider 302 such that live mapping data for the complete road journey A-B can be obtained collectively by the group of mobile devices 1-4. Each device 1-4 can then provide the received mapping data for its respective sub-portion for use by the plurality of travellers. The mobile devices 1-4 may be configured to provide the live mapping data as soon as it is received, or they may be configured to store the live mapping date for provision at a later time. This provision may be done by each mobile device 1-4 providing the live mapping data visually using its own display. In other examples, the live mapping data may be respectively transmitted to a central navigation controller device which is then able to display the live mapping data for the whole journey. This navigation controller device may be the apparatus 204 which also does the assigning according to the at least one predefined assignment criterion.

By splitting/portioning the defined journey A-B between a group of mobile devices 1-4, the mapping application and mapping data provider 302 associated with each device 1-4 are only able to acquire knowledge of the respective sub-portion. Since the mapping application and data provider 302 associated with one device 1 typically operate independently of the mapping application and data provider 302 associated with another device 2-3 (e.g. because each device 1-4 uses a different application, data provider 302 or user account), none of the mapping applications or mapping data providers 302 are able to acquire the location details of the complete journey A-B. This provides the travellers with a greater degree of privacy. Also, in examples with a central navigation controller device which receives the live mapping data for the whole journey from the group of mobile devices 1-4, the traveller's privacy is still preserved because the central device did not itself request the live mapping data from the mapping data provider 302.

The mobile devices 1-4 may be configured to obtain the live mapping data for their respective sub-portions before or during the journey A-B. Obtaining the live mapping data before setting off avoids any potential issues with connecting to the mapping data provider 302 on route. However, given that the live mapping data for a particular sub-portion relates to the current (i.e. real-time) state of that particular sub-portion, any data obtained before the journey could potentially be out-of-date by the time the travellers reach the associated sub-portion. In this respect, each mobile device 1-4 may be configured to obtain live mapping data for its respective sub-portion when the current location of the mobile device or group of mobile devices 1-4 corresponds to the start of the respective sub-portion (e.g. within a predefined tolerance/distance/time of the start point). This approach ensures that the live mapping data obtained for each sub-portion of the journey is applicable during the time at which the one or more travellers are located within the sub-portion.

Figure 4A:
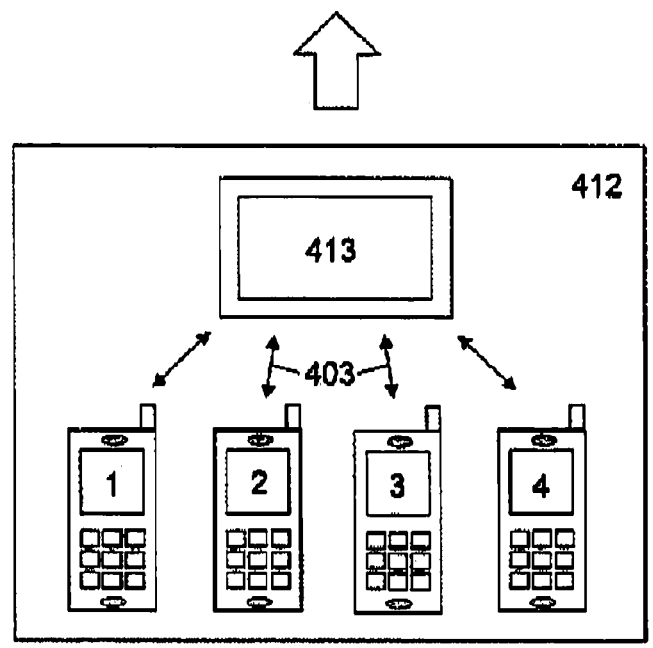
FIG. 4a illustrates schematically a group of mobile devices travelling the road journey in a single vehicle.

FIG. 4a shows a group of mobile devices 1-4 associated with one or more travellers in a single vehicle 412. In this scenario, each device 1-4 may be configured to provide the live mapping data for its respective sub-portion by presenting the live mapping data to the one or more travellers in the vehicle 412 for live navigation of the road journey (e.g. using the electronic display and loudspeaker of the mobile device 1-4 to provide visual and audio data, respectively). Although this may be the simplest option, the need for the driver or navigator to switch between the various devices 1-4 at each change in sub-portion may be considered to be inconvenient or impractical.

To address this issue, each mobile device 1-4 may be configured to provide the live mapping data for its respective sub-portion by transmitting the live mapping data to a central device 413 (e.g. the aforementioned central navigation controlling device) for live navigation of the road journey. Transmission of the live mapping data to the central device 413 means that the driver or navigator can focus on a single device 413 for live navigation data throughout the entire duration of the journey. The data exchange between the mobile devices 1-4 and the central device 413 may occur over any wired or wireless connection 403, such as via a data cable, Bluetooth™ or WiFi™. In addition, the central device 413 may be one of the group of mobile devices 1-4 (e.g. the mobile device 1 having one or more of the greatest processing power, battery life and data security), or it may be a separate device. In the example shown, the central device 413 is a tablet computer having a larger electronic display than the group of mobile devices 1-4 to facilitate shared viewing of the live mapping data by all travellers in the vehicle 412. In other examples, the tablet computer may be one of the group of mobile devices.

In some cases, a remote server which does not form part of the group of mobile devices may be configured to control the provision of live mapping data by the mobile devices by controlling the mobile devices sequentially according to the order of the sub-portions in the defined journey.

Figure 4B:
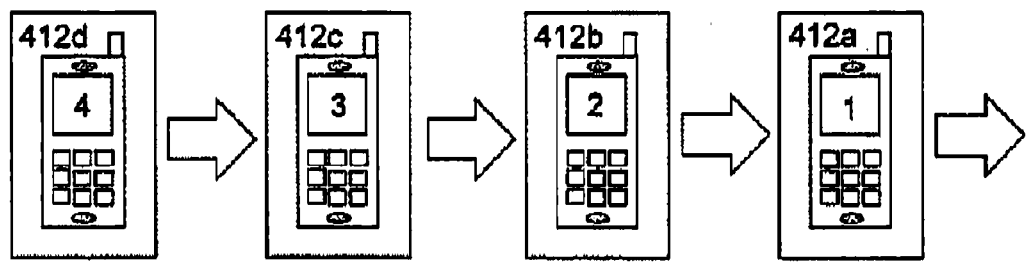
FIG. 4b illustrates schematically a group of mobile devices travelling the road journey in respective vehicles.

FIG. 4b shows a group of mobile devices 1-4 associated with a plurality of travellers in respective vehicles 412a-d (e.g. a convoy of motorcyclists). In this scenario, a different traveller/vehicle 412a-d is chosen to lead the convoy through each sub-portion of the road journey according to its respective assignment. In some cases, it may be advantageous for the mobile device 1 associated with the leading traveller/vehicle 412a to transmit the bye mapping data for its respective sub-portion to at least one of the other mobile devices 2-4. One such situation may arise when the leading traveller/vehicle 412a is travelling faster than the rest of the convoy 412b-d and, as a result, disappears out of sight of the other travellers 412b-d. In this situation, the mobile device 1 associated with the leading traveller/vehicle 412a may transmit the live mapping data for its respective sub-portion to the mobile device 2 associated with the next traveller/vehicle 412b in the convoy sequence. This live mapping data allows the next traveller 412b to continue navigation through the current sub-portion and assume leadership of the subsequent travellers/vehicles 412c,d.

In some cases, the leading traveller/vehicle 412a may be expected to coordinate the other travellers/vehicles 412b-d in the convoy. This situation may arise, for example, if the other travellers 412b-d are not told which sub-portion has been assigned to their respective device 2-4 before setting off on the journey, or if the other travellers 412b-d keep the mapping application on their respective devices 2-4 turned off to preserve battery life until they are required to lead the convoy. In this scenario, the mobile device 1 associated with the leading traveller/vehicle 412a may be configured to transmit an instruction to one of the other mobile devices 2 when the current location of the group of mobile devices 1-4 (or the other mobile device 2) corresponds to the start of the respective sub-portion assigned to the other mobile device 2, the transmitted instruction configured to prompt the traveller 412b associated with the other mobile device 2 to lead the plurality of travellers 412a-d for the duration of the respective sub-portion. Additionally or alternatively, the mobile device 1 associated with the leading traveller/vehicle 412a may be configured to transmit an instruction to the other mobile devices 2-4 which specifies a particular sequence in which the associated travellers/vehicles 412b-d should be travelling within the convoy. This instruction can, of course, be done by a central server which is not one of the group of mobile devices.

As stated above, the respective sub-portions of the defined road journey A-B are assigned to the group of mobile devices 1-4 according to at least one predefined assignment criterion. The at least one predefined assignment criterion may comprise a device criterion related to the capability of each mobile device 1-4 in providing live mapping data for a particular sub-portion of the road journey A-B. For example, the device criterion may be based on one or more of the processing power, battery life and network coverage of the mobile device 1-4 at the particular sub-portion of the road journey A-B. Relatively accurate network coverage information is usually available for telecommunication networks. In the case of processing power and battery life, however, the device criterion may be based on a prediction of the expected processing power or remaining battery life at the particular sub-portion based on the current state of the device 1-4 in combination with the device history and predicted usage.

Additionally or alternatively, the at least one predefined assignment criterion may comprise a traveller sensitivity criterion related to the sensitivity of the traveller associated with each mobile device 1-4 to a particular sub-portion of the road journey A-B. The traveller sensitivity criterion may be based on the sensitivity of the traveller to one or more of a location within the sub-portion (e.g. because the traveller does not wish his/her visit to a particular location to be known or logged), a time of travel within the sub-portion (e.g. because the traveller does not wish his/her visit to a particular location at a particular time to be known or logged) and a history of travel within the sub-portion (e.g. because the traveller does not wish the frequency of his/her visits to a particular location to be known or logged). For example, the traveller may not wish his/her visit or frequency of visits to a casino to be known, or the traveller may not wish his/her visit to the beach at a time when he/she is supposed to be on a business trip to be known. The traveller sensitivity criterion for each traveller may be stored locally on the associated mobile device 1-4 and obtained on request for use in assignment of the respective sub-portions.

As described with reference to FIG. 4b, the group of mobile devices 1-4 may be associated with a plurality of travellers using respective vehicles 412a-d for the road journey in which a different traveler/vehicle 412a leads the other travellers/vehicles 412b-d through each sub-portion of the road journey. In this scenario, the at least one predefined assignment criterion may additionally or alternatively comprise a suitability criterion related to the suitability of each traveller or vehicle 412a-d in leading the plurality of travellers for the duration of a particular sub-portion of the road journey. This criterion may help to ensure that the leading traveler or vehicle 412a-d is competent enough to handle the road network within the particular sub-portion (e.g. the traveller is not put off by city-centre driving, or the vehicle 412a-d is capable of driving at reasonable speed through a section of motorway), or that the leading traveller 412a can be trusted to drive sensibly through the road network within the particular sub-portion (e.g. driving in a way which allows the other travellers/vehicles 412b-d to keep up, or driving in a way which reduces the risk of danger to the other travellers 412b-d).

In some cases, each mobile device 1-4 may be assigned an equally sized sub-portion (e.g. in terms of distance or time) of the road journey. This approach not only means that each traveller 412a-d has an equal snare of the navigational effort and responsibility, but it also limits the amount of journey disclosed to any one mapping application or data provider and the amount of live mapping data which needs to be obtained by any one mobile device 1-4. In other examples, some mobile devices 1-4 may be assigned different sizes of sub-portion. This may be based on the structure of the mad network, or the capability of the mobile device 14, traveller or vehicle 412a-d. For instance, in the convoy scenario mentioned above, the sub-portions may be assigned in such a way that the end points of each sub-portion correspond to locations at which it is safe and/or convenient for the vehicles 412a-d to overtake one another on the road network in order to effect a change in leadership.

FIGS. 5a and 6b illustrate two different ways of implementing the above-mentioned assignment criteria when assigning the various sub-portions A-1, 1-2, 2-3 and 3-B of the journey to the different mobile devices 1-4 in the group. In some cases, an assignment criterion may result in a situation where a possible assignment is unfeasible (e.g. because the device 1-4 has no network coverage at that location), whilst in other cases, an assignment criterion may result in a situation where a possible assignment is feasible but unfavourable (e.g. because the associated traveller would prefer that his/her presence at that location was not known or logged, or because the network usage at that location would be too expensive for the associated traveller due to the location being outside the region covered by their usual network provider).

In the former scenario, the sub-portions of the journey may be assigned to the mobile devices 1-4 according to a binary system based on the at least one predefined assignment criterion. As illustrated in FIG. 5a, this approach involves putting a tick or cross next to each sub-portion for each device 1-4 based on the assignment criterion to indicate those devices which are capable of handling the various sub-portions. Once the table is complete, each device 1-4 can then be assigned a different sub-portion such that all sub-portions have been assigned. The table may be completed by asking specific questions to each of the respective travellers, or by using predefined traveller settings received in respect of the travellers.

In some scenarios, each sub-portion may only be assignable to one particular device based on the at least one assignment criterion (i.e. a single tick for each sub-portion), whilst in other scenarios, some sub-portions may be assignable to multiple devices (i.e. multiple ticks for those sub-portions). In the latter situation, the sub-portions may be assigned to the capable devices (randomly or sequentially) such that the journey is shared between all devices in the group. In FIG. 5a, for example, each sub-portion of the journey has been randomly assigned to a capable mobile device such that each device has one sub-portion each: sub-portion A-1 has been assigned to device 1; sub-portion 1-2 has been assigned to device 3; sub-portion 2-3 has been assigned to device 4; and sub-portion 3-B has been assigned to device 2.

When the at least one assignment criterion results in feasible assignments with differing levels of traveller preference, the assignment process may be implemented using a scoring system rather than a binary system. As shown in FIG. 5b, this approach involves putting a score 0-3 next to each sub-portion for each device 1-4 based on the assignment criterion to indicate the level of traveler preference. For example, a score of "0" may be used to indicate that a traveller really does not wish to be assigned the corresponding sub-portion (or that his/her device is not capable of handling that sub-portion), whilst a score of "3" may be used to indicate that a traveller strongly welcomes that particular assignment. Of course, a reverse scoring system could be used instead where a lower number indicates a greater preference for a particular sub-portion.

Once the table is complete, each device 1-4 can then be assigned a different sub-portion based on the scoring such that all sub-portions have been assigned. This may be performed by assigning each sub-portion to the device with the highest (or lowest) score for that particular sub-portion until each device has one sub-portion each. In some scenarios, however, two or more devices may have the same score for the same sub-portion of the journey. In this scenario, one of these devices may be chosen randomly or sequentially. In FIG. 5b, for example, sub-portion A-1 has been assigned to device 1; sub-portion 1-2 has been assigned to device 4; sub-portion 2-3 has been assigned to device 2; and sub-portion 3-B has been assigned to device 3. In this example, device 1 was chosen over device 4 for sub-portion A-1 because device 1 is higher in the sequence of devices 1-4. Similarly, device 2 was chosen over device 4 for sub-portion 2-3 because device 2 is higher in the sequence of devices 1-4.

There may be situations when one or more sub-portions of the journey cannot be suitably assigned to any of the mobile devices 1-4 in the group based on the at least one predefined assignment criterion. For example, this may occur because none of the devices 1-4 are able to get a network signet within a particular sub-portion or because none of the travellers wish to be "seen" in a particular sub-portion. In some cases, it may be possible simply to leave that particular sub-portion unassigned if one of travellers is sufficiently familiar with the sub-portion that the associated live mapping data is not required. This is not always an option, however. It will be appreciated that such information may be obtained using traveller preference settings received from the respective mobile devices.

FIGS. 6a and 6b illustrate two different strategies that may be adopted when it is not possible to leave a sub-portion unassigned. As shown in FIG. 6a, one approach is to assign an alternative set of sub-portions A-1', 1'-2', 2'-3' and 3'-B to the group of mobile devices 1-4. By adjusting the position of the start and/or end point of each sub-portion, one or more of the alternative sub-portions may have a different size/length than the original equivalent sub-portions. In this example, device 1 has been assigned sub-portion A-1' (which is longer than original sub-portion A-1 in terms of time and/or distance), device 2 has been assigned sub-portion 1'-2' (which is shorter than original sub-portion 1-2), device 3 has been assigned sub-portion 2'-3' (which is about the same size as original sub-portion 2-3), and device 4 has been assigned sub-portion 3'-B (which is shorter than original sub-portion 3-B). If one or more of the alternative sub-portions cannot be assigned to any of the mobile devices 1-4, this process can be repeated until a complete set of assignable sub-portions are found.

Another approach when one or more sub-portions of the road journey cannot be suitably assigned to any of the mobile devices 1-4 is to assign sub-portions A-1", 1"-2", 2"-3" and 3"-B of an alternative road journey A-B to the respective devices instead. As shown in FIG. 6b, the alternative road journey A-B has the same start location A and end B location as the original road journey but involves a different route between these two locations A, B. In this example, device 1 has been assigned sub-portion A-1", device 2 has been assigned sub-portion 1"-2", device 3 has been assigned sub-portion 2"-3", and device 4 has been assigned sub-portion 3"-B. Although the alternative journey A-B shown in FIG. 6b is larger/longer than the original journey, it could be the same size/length or even smaller in size/length. Similarly, the sub-portions of the alternative journey may or may not be the same size/length as the equivalent sub-portions of the original journey.

Figures 7A, 7B, 7C, 8:
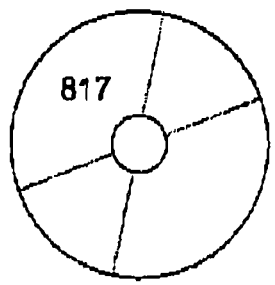
FIGS. 7a-c illustrate schematically the main steps of a method described herein.
FIG. 8 shows a computer-readable medium comprising a computer program configured to perform, control or enable one or more method steps described herein.

FIGS. 7a-c illustrate schematically steps 714-716 of a method performed by a system described herein. The method generally comprises: assigning respective sub-portions of a defined road journey to each of a group of mobile devices associated with one or more travellers according to at least one predefined assignment criterion 714; providing/ending live creeping data for the assigned sub-portion of the defined road journey 715; and using live mapping data received from the respective mobile devices for live navigation of the defined road journey 716.

One or more of method steps 714 and 716 may be performed by an apparatus which is or forms part of one of the group of mobile devices, or by an apparatus which is or forms part of a device separate to the group of mobile devices. In the latter case, the apparatus may be a remote server (e.g. located in the cloud 302). Method step 715 may be performed by an apparatus which is or forms part of one of the group of mobile devices, or by a central server not forming part of the group.

It will be appreciated that one or more of the functions described herein may be performed by the same apparatus. It will also be appreciated that one or more of the apparatuses may be associated with the same user/traveller by use of a common/particular user account. In this way, content on one device may be transitioned to another (e.g. partner) device of the same user account to allow the other device to be used. For example, the mapping content for a particular sub-portion can be associated with the same user account so that the user/traveller can switch from his/her mobile phone to his/her phablet or tablet during the sub-portion. This may be done to take advantage of features provided by the other device, such as longer battery life or a larger display.

FIG. 8 illustrates schematically a computer/processor readable medium 817 providing a computer program according to one embodiment. The computer program may comprise computer code configured to perform, control or enable one or more of the method steps 714-718 of FIGS. 7a-c. In this example, the computer/processor readable medium 817 is a disc such as a digital versatile disc (DVD) or a compact disc (CD). In other embodiments, the computer/processor readable medium 817 may be any medium that has been programmed in such a way as to carry out an inventive function. The computer/processor readable medium 817 may be a removable memory device such as a memory stick or memory card (SD, mini SD, micro SD or nano SD).

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of arty mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structure and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a sew employs a helical surface, in the environment of fastening wooden parts, a nail and a screw may be equivalent structures.

The invention claimed is:

1. An apparatus comprising a processor and memory including computer program code, the memory and computer program code configured to, with the processor, enable the apparatus at least to:
during travel on a defined road journey through a road network from a start location to an end location, use received live mapping data for live navigation for the road journey, the live mapping data received from each of a group of mobile devices associated with one or more travellers for the road journey, each of the group of mobile devices configured to request, from a mapping data provider, live mapping data for only a respective sub-portion of the road journey, the respective sub-portion being assigned to a respective mobile device according to a predefined assignment criterion, and each of the group of mobile devices further configured to provide the requested live mapping data.

2. The apparatus of claim 1, wherein the predefined assignment criterion comprises a device capability criterion related to a capability of a respective mobile device in providing live mapping data for a particular sub-portion of the road journey.

3. The apparatus of claim 2, wherein the device capability criterion is based on one or more of:
a) a processing power;
b) a battery life; and
c) a network coverage of the mobile device at the particular sub-portion of the road journey.

4. The apparatus of claim 2, wherein the apparatus is configured to assign the respective sub-portions according to a binary system or scoring system based on the at least one predefined assignment criterion.

5. The apparatus of claim 2, wherein the apparatus is configured to at least one of:
assign alternative sub-portions of the defined road journey to the respective mobile devices if the sub-portions cannot be suitably assigned according to the at least one predefined assignment criterion;
assign respective sub-portions of an alternative road journey through the road network from the start location to the end location if the sub-portions of the defined road journey cannot be suitably assigned according to the at least one predefined assignment criterion; and
assign a plurality of equally sized sub-portions to the respective mobile devices corresponding to the number of mobile devices forming the group of mobile devices.

6. The apparatus of claim 1, wherein the at least one predefined assignment criterion comprises a traveller sensitivity criterion related to the sensitivity of a traveller associated with each mobile device to a particular sub-portion of the road journey.

7. The apparatus of claim 6, wherein the traveller sensitivity criterion is based on the sensitivity of the traveller to one or more of a location within the sub-portion, a time of travel within the sub-portion and a history of travel within the sub-portion.

8. The apparatus of claim 6, wherein the traveller sensitivity criterion for each traveller is stored locally on the associated mobile device, and wherein the apparatus is configured to receive the traveller sensitivity criterion from the associated mobile device on request.

9. The apparatus of claim 1, wherein the group of mobile devices are associated with a plurality of travellers using respective vehicles for the road journey, and wherein the apparatus is configured to assign a plurality of sub-portions to the respective mobile devices having end points at locations where it is safe and/or convenient for the vehicles to overtake one another on the road network.

10. The apparatus of claim 1, wherein the group of mobile devices are associated with a plurality of travellers using respective vehicles for the road journey, and wherein the apparatus is configured to transmit an instruction to one of the mobile devices when the current location of the group of mobile devices corresponds to the start of the respective sub-portion assigned to that particular mobile device, the instruction configured to prompt the traveller associated with the mobile device to lead the plurality of travellers for the duration of the respective sub-portion.

11. The apparatus of claim 1, wherein the group of mobile devices are associated with a plurality of travellers using respective vehicles for the road journey, and wherein the predefined assignment criterion comprises a suitability criterion related to the suitability of each traveller or vehicle in leading the plurality of travellers for the duration of a particular sub-portion of the road journey.

12. The apparatus of claim 1, wherein the live mapping data comprises one or more of navigation data, travel updates, weather updates, local news and advertising data for the respective sub-portions of the road journey.

13. A system comprising the apparatus of claim 1 and the group of mobile devices.

14. The system of claim 13, wherein some or all of the mobile devices forming the group of mobile devices are associated with the same traveller or different travelers.

15. A method comprising: during travel on a defined road journey through a road network from a start location to an end location, using received live mapping data for live navigation for the journey, the live mapping data received from each of a group of mobile devices associated with one or more travellers for the road journey, each of the group of mobile devices configured to request, from a mapping data provider, live mapping data for only a respective sub-portion of the road journey, the respective sub-portion being assigned to a respective mobile device according to a predefined assignment criterion, and each of the group of mobile devices further configured to provide the requested live mapping data.

16. The method of claim 15, wherein the predefined assignment criterion comprises a device capability criterion related to a capability of a respective mobile device in providing the live mapping data for a particular sub-portion of the road journey.

17. The method of claim 16, wherein the device capability criterion is based on one or more of:

a) a processing power, b) a battery life, and c) a network coverage of the mobile device at the particular sub-portion.

18. The method of claim 15, wherein the at least one predefined assignment criterion comprises a travellers sensitivity criterion to the sensitivity of a traveller associated with each mobile device to a particular sub-portion of the journey.

19. The method of claim 18 wherein the travellers sensitivity criterion is based on the sensitivity of the traveller to one or more of a location within a sub-portion, a time of travel within the sub-portion and a history of travel in a sub-portion.

* * * * *